US012746899B2

(12) United States Patent
Oshita et al.

(10) Patent No.: US 12,746,899 B2
(45) Date of Patent: Sep. 29, 2026

(54) EMERGENCY DRIVING AND STOP SYSTEM

(71) Applicant: Isuzu Motors Limited, Yokohama (JP)

(72) Inventors: Wasantha Oshita, Fujisawa (JP); Yasuyuki Maekawa, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 435 days.

(21) Appl. No.: 18/282,803

(22) PCT Filed: Mar. 18, 2022

(86) PCT No.: PCT/JP2022/012510

§ 371 (c)(1),
(2) Date: Sep. 19, 2023

(87) PCT Pub. No.: WO2022/202645

PCT Pub. Date: Sep. 29, 2022

(65) Prior Publication Data

US 2024/0166175 A1 May 23, 2024

(30) Foreign Application Priority Data

Mar. 25, 2021 (JP) ................................ 2021-051975

(51) Int. Cl.
*B60T 7/14* (2006.01)
*B60T 8/17* (2006.01)
*B60T 17/22* (2006.01)

(52) U.S. Cl.
CPC .............. *B60T 7/14* (2013.01); *B60T 8/1701* (2013.01); *B60T 17/221* (2013.01); *B60T 2270/402* (2013.01)

(58) Field of Classification Search
CPC ........ B60T 7/14; B60T 8/1701; B60T 17/221; B60T 2270/402; B60T 8/96; B60T 17/20; B60T 17/22
See application file for complete search history.

(56) References Cited

U.S. PATENT DOCUMENTS

2012/0292139 A1 11/2012 Hanzawa et al.
2017/0009691 A1 1/2017 Nakatsuka et al.
(Continued)

FOREIGN PATENT DOCUMENTS

CN 102785651 11/2012
CN 106335366 1/2017
(Continued)

OTHER PUBLICATIONS

Chinese Patent No. CN 102971175 to Kobana et al published on Mar. 13, 2013.*
(Continued)

*Primary Examiner* — Pamela Rodriguez

(57) ABSTRACT

Provided is a driver error response system with which it is possible to further increase safety during a driver error. This driver error response system has a switch operated during an error of the driver, an electronically controlled braking system that can execute automatic braking, a vehicle-external output unit that informs the outside of the vehicle that the driver error response system is operating, and a control unit that turns on the electronically controlled braking system and the vehicle-external output unit when at least the switch is operated, the control unit continuing the ON operation of the electronically controlled braking system when a part related to the driver error response system fails during the operation of the driver error response system.

2 Claims, 1 Drawing Sheet

(56) References Cited

U.S. PATENT DOCUMENTS

| | | | |
|---|---|---|---|
| 2018/0105168 A1 | 4/2018 | Kozuka | |
| 2021/0179037 A1* | 6/2021 | Heller | B60W 10/10 |

FOREIGN PATENT DOCUMENTS

| | | |
|---|---|---|
| JP | 06-305404 | 11/1994 |
| JP | 2011-057134 | 5/2011 |
| JP | 2018-062309 | 4/2018 |
| JP | 2020-019320 | 2/2020 |

OTHER PUBLICATIONS

WO document No. WO 2015/080655 to Claesson published on Jun. 4, 2015.*

German Patent No. DE 102005016001 to Jaeger published on Aug. 18, 2022.*

Translation of Japanese Patent No. JP 2011057134 obtained from website: https://worldwide.espacenet.com on Dec. 22, 2025.*

Translation of Japanese Patent No. JP 2020019320 obtained from website: https://worldwide.espacenet.com on Dec. 22, 2025.*

Translation of Japanese Patent No. JPH 06305404 obtained from patent database PE2E on Dec. 22, 2025.*

* cited by examiner

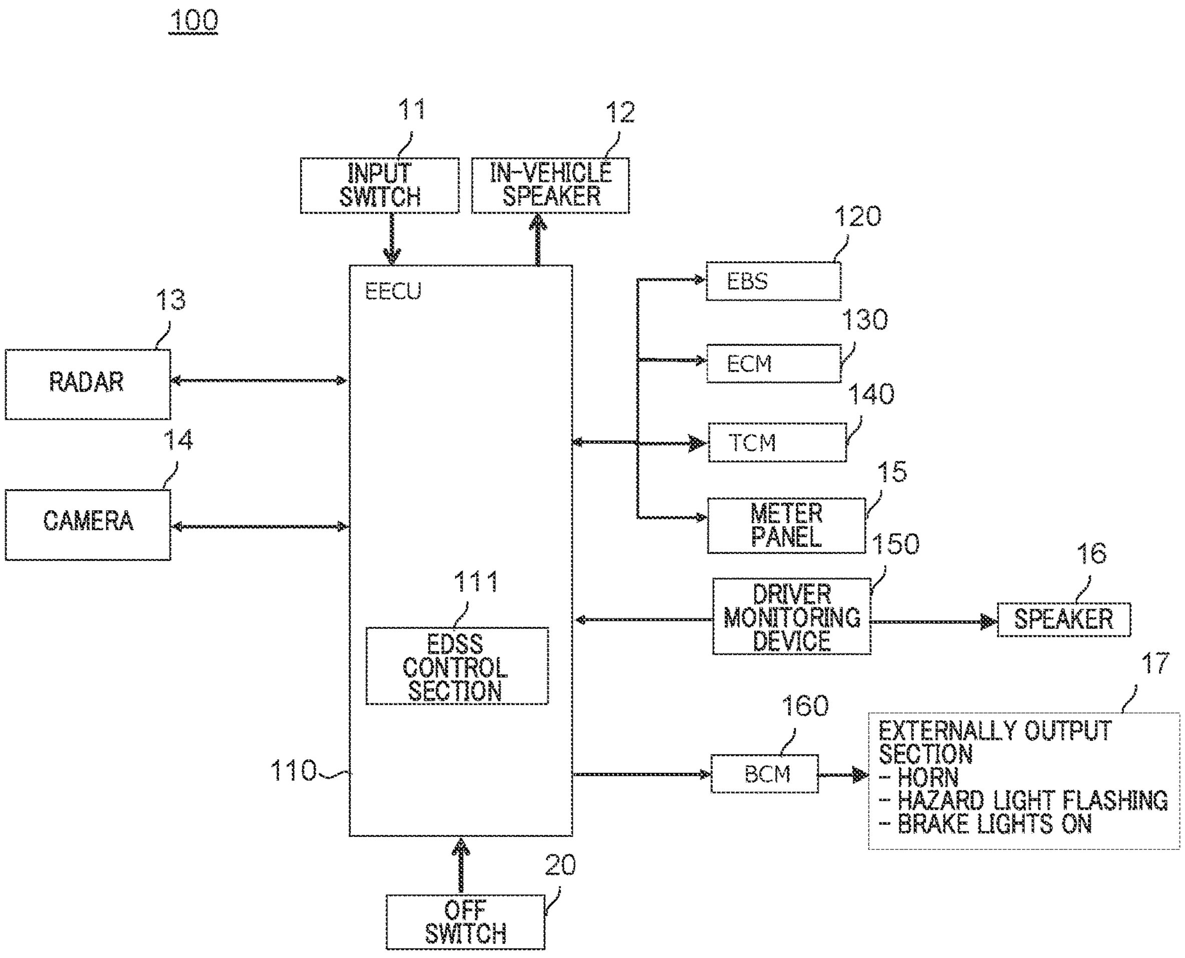
100
11
INPUT SWITCH
12
IN-VEHICLE SPEAKER
120
EBS
130
ECM
140
TCM
15
METER PANEL
150
DRIVER MONITORING DEVICE
16
SPEAKER
17
EXTERNALLY OUTPUT SECTION
- HORN
- HAZARD LIGHT FLASHING
- BRAKE LIGHTS ON
160
BCM
13
RADAR
14
CAMERA
EECU
111
EDSS CONTROL SECTION
110
20
OFF SWITCH

EMERGENCY DRIVING AND STOP SYSTEM

TECHNICAL FIELD

The present disclosure relates to a system for dealing when an abnormality occurs in a driver (herein also referred to as "emergency driving stop system"), the system referred to as Emergency Driving and Stop System (EDSS).

BACKGROUND ART

Conventionally, a vehicle such as a bus is equipped with an emergency driving stop system referred to as EDSS. EDSS operates as follows: during driving, when a camera detects that the driver is unable to drive safely due to a sudden illness or other condition, or when the emergency brake switch is operated by a passenger or crew member, automatic braking is activated and the vehicle slows down to a stop.

Patent Literature (hereinafter, referred to as PTL) 1 describes such EDSS.

CITATION LIST

Patent Literature

PTL 1

Japanese Patent Application Laid-Open No. 2011-57134

SUMMARY OF INVENTION

Technical Problem

In conventional EDSS, sufficient thought has not been given to the case where the vehicle breaks down due to a collision or the like after the automatic braking is activated by the EDSS.

The present disclosure has been made in view of the above circumstance, and an object of the present disclosure is to provide an emergency driving stop system capable of improving safety when an abnormality occurs in the driver.

Solution to Problem

One aspect of an emergency driving stop system of the present disclosure includes:

a switch configured to be operated when an abnormality occurs in a driver;

an electronically controlled braking system capable of performing automatic braking;

an externally output section configured to notify an outside of the vehicle of the vehicle that the emergency driving stop system is in operation; and a control section configured to turn on the electronically controlled braking system and the externally output section to perform an ON operation at least when the switch is operated, in which the control section maintains the ON operation of the electronically controlled braking system when a portion related to the emergency driving stop system breaks down during the operation of the emergency driving stop system.

Advantageous Effects of Invention

The present disclosure is capable of achieving an emergency driving stop system that can improve safety when an abnormality occurs in the driver.

BRIEF DESCRIPTION OF DRAWINGS

The FIGURE is a block diagram illustrating a configuration example of an emergency driving stop system according to an embodiment.

DESCRIPTION OF EMBODIMENT

First, before describing the embodiments, the background leading to the present invention will be described.

In a vehicle equipped with EDSS, during driving, when a camera detects that the driver is unable to drive safely due to a sudden illness or other condition, or when the emergency brake switch is operated by a passenger or crew member, automatic braking is activated and the vehicle slows down to a stop.

In general, automatic braking by the EDSS has a constraint such that the deceleration rate cannot be less than $-2.45$ m/s$^2$ in view of the impact on surrounding traffic and passengers. In other words, the vehicle in which the EDSS has been activated does not decelerate abruptly, but comes to a stop while gradually decelerating.

Therefore, the vehicle may collide with the side wall of a road or the like before it stops, causing the vehicle to break down.

The inventors of the present invention have arrived at the present invention based on the idea such that in the event of a breakdown, the possibility of stopping of the automatic braking reduces safety.

One feature of the present invention is that even when a breakdown is detected in an EDSS-related component during the EDSS operation, the automatic braking continues to operate. This configuration can safely stop vehicles.

Hereinafter, an embodiment of the present invention will be described in detail with reference to the drawings.

The FIGURE is a block diagram illustrating a configuration example of emergency driving stop system (hereinafter referred to as "EDSS") 100 according to an embodiment of the present disclosure. EDSS 100 is mounted on, for example, a bus.

EDSS 100 includes EDSS control ECU (EECU) 110, electric brake system (namely electronically controlled braking system, EBS) 120, engine control module (ECM) 130, transmission control module (TCM) 140, driver monitoring device 150, and body control module (BCM) 160. These components have known configurations; thus detailed descriptions thereof are omitted in the description. EECU 110 is provided with EDSS control section 111.

Driver monitoring device 150 includes, for example, a camera, detects an abnormality of the driver, and outputs the detection result to EDSS control section 111.

In addition, EDSS 100 includes input switch 11, in-vehicle speaker 12, radar 13, camera 14, meter panel 15, speaker 16, and externally output section (a section performing the output to the outside of the vehicle) 17. Input switch 11 is a button for starting the operation of the EDSS, and a plurality of input switches 11 are provided at a plurality of locations inside the vehicle. Radar 13 and camera 14 are provided to acquire peripheral information including the front of the vehicle. Indicators and the like are provided on meter panel 15. Speaker 16 is provided at the driver's seat and outputs an audible warning to the driver. Externally output section 17 is composed of a device capable of informing surrounding vehicles and the like that the EDSS is operating, and includes, for example, a horn, hazard lights, and/or brake lights. The example of the FIGURE illustrates an operation in which the horn is activated by BCM 160; however, the horn may be activated by EECU 110.

When driver monitoring device 150 detects an abnormality of the driver or input switch 11 is operated, EDSS control section 111 activates the EDSS. During the operation of the EDSS, EDSS control section 111 outputs a control signal for activating the automatic braking to EBS 120, thereby decelerating the vehicle at the deceleration rate according to the EDSS specifications. In addition, EDSS control section 111 causes in-vehicle speaker 12 to output that the EDSS has been activated, causes the indicator on meter panel 15 to display that the EDSS has been activated, and sounds the horn, flashes the hazard lights, and turns on the brake lights all of externally output section 17.

Here is assumed that a component related to the EDSS, such as BCM 160, breaks down due to a vehicle collision or the like while the EDSS is operating. EDSS control section 111 detects the breakdown of the EDSS-related component in the form of, for example, an input signal indicating the failure from BCM 160.

However, EDSS control section 111 of the present embodiment outputs to EBS 120 a control signal instructing to maintain the operation of the automatic braking. EDSS control section 111 maintains the operation of the automatic braking until the vehicle stops.

EDSS control section 111 continues to output the control signal instructing the operation of the automatic braking until the EDSS off command is received from off switch 20 for turning off the EDSS. As a result, even when there is a breakdown, the operation of the EDSS is maintained until the EDSS is turned off intentionally, thereby improving safety.

In practice, EDSS control section 111 includes main components, such as a central processing unit (CPU), a read only memory (ROM), and a random access memory (RAM). The CPU reads programs corresponding to the processing content from the ROM, loads the programs in the RAM, and cooperates with the loaded programs to execute the above-described operations of EDSS control section 111. All or part of EDSS control section 111 may be formed from a hard-wired circuit such as an application specific integrated circuit (ASIC) or a field-programmable gate array (FPGA).

As described above, the emergency driving stop system according to the present embodiment includes the following: input switch 11 configured to be operated when an abnormality occurs in a driver; an electronically controlled braking system (EBS) 120 capable of performing automatic braking; externally output section 17 configured to notify an outside of the vehicle that the emergency driving stop system is in operation; and a control section (EDSS control section 111) configured to turn on electronically controlled braking system (EBS) 120 and externally output section 17 to perform an ON operation at least when input switch 11 is operated. In the emergency driving stop system, the control section (EDSS control section 111) maintains (still continues) the ON operation of electronically controlled braking system (EBS) 120 when a portion related to the emergency driving stop system breaks down during the operation of the emergency driving stop system.

This configuration can safely stop vehicles even in the event of a breakdown.

The embodiments above are no more than specific examples in carrying out the present invention, and the technical scope of the present invention is not to be construed in a limitative sense due to the specific examples. That is, the present invention can be carried out in various forms without departing from the spirit and the main features thereof.

In addition to the above embodiments, EDSS control section 111 may output a control signal that instructs EBS 120 to generate a larger brake pressure after the vehicle, equipped with the emergency driving stop system, is stopped than during deceleration. Such a configuration can prevent the vehicle from sliding down when the vehicle is stopped at a slope.

This application is entitled to and claims the benefits of Japanese Patent Application No. 2021-051975 dated Mar. 25, 2021, the disclosures of which including the specification, drawings and abstract are incorporated herein by reference in its entirety.

INDUSTRIAL APPLICABILITY

The emergency driving stop system of the present disclosure is suitable for use, for example, in a bus.

REFERENCE SIGNS LIST

11 Input Switch
12 In-vehicle speaker
13 Radar
14 Camera
15 Meter panel
16 Speaker
17 Externally output section
100 Emergency driving stop system (EDSS)
110 EDSS control ECU (EECU)
120 EBS (electric brake system: electronically controlled braking system)
130 ECM (engine control module)
140 TCM (transmission control module)
150 Driver monitoring device
160 BCM (body control module)

The invention claimed is:

1. An emergency driving stop system, comprising:

a switch configured to be operated when an abnormality occurs in a driver;

an electronically controlled braking system capable of performing automatic braking;

an externally output section configured to notify an outside of the vehicle that the emergency driving stop system is in operation; and a control section configured to turn on the electronically controlled braking system and the externally output section to perform an ON operation at least when the switch is operated, wherein the control section maintains the ON operation of the electronically controlled braking system when a portion related to the emergency driving stop system breaks down during the operation of the emergency driving stop system, and the control section is configured to detect the breakdown based on an input signal indicating a failure of the portion and to continue to output a control signal instructing operation of the automatic braking until an off command is received from an off switch for turning off the emergency driving stop system.

2. The emergency driving stop system according to claim 1, wherein the control section outputs a control signal that instructs the electronically controlled braking system to generate a larger brake pressure after the vehicle is stopped than during deceleration, the vehicle being a vehicle equipped with the emergency driving stop system.

* * * * *